(12) United States Patent
Catalano et al.

(10) Patent No.: US 11,683,273 B2
(45) Date of Patent: Jun. 20, 2023

(54) ENDPOINT NOTIFICATION OF STORAGE AREA NETWORK CONGESTION

(71) Applicant: International Business Machines Corporation, Armonk, NY (US)

(72) Inventors: Pasquale A. Catalano, Wallkill, NY (US); Chris Moretti, Tillson, NY (US); Stephen Robert Guendert, Poughkeepsie, NY (US); Christopher J. Colonna, Ossining, NY (US); Michael James Becht, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 10 days.

(21) Appl. No.: 17/108,088

(22) Filed: Dec. 1, 2020

(65) Prior Publication Data
US 2022/0174021 A1 Jun. 2, 2022

(51) Int. Cl.
*H04L 47/33* (2022.01)
*H04L 47/11* (2022.01)
*H04L 47/122* (2022.01)
*H04L 67/1097* (2022.01)

(52) U.S. Cl.
CPC .............. *H04L 47/33* (2013.01); *H04L 47/11* (2013.01); *H04L 47/122* (2013.01); *H04L 67/1097* (2013.01)

(58) Field of Classification Search
CPC ....... H04L 47/33; H04L 47/11; H04L 47/122; H04L 67/1097
See application file for complete search history.

(56) References Cited

U.S. PATENT DOCUMENTS

| | | | |
|---|---|---|---|
| 7,421,511 B2* | 9/2008 | Shiga | H04L 47/10 709/212 |
| 7,764,675 B2 | 7/2010 | Rooholamini et al. | |
| 9,712,451 B2 | 7/2017 | Birke et al. | |
| 10,193,810 B2 | 1/2019 | Hira | |
| 10,348,639 B2 | 7/2019 | Puchala et al. | |
| 10,412,015 B2 | 9/2019 | Sundararaman et al. | |
| 2004/0249929 A1* | 12/2004 | Goodman | H04L 63/10 709/224 |
| 2005/0060598 A1* | 3/2005 | Klotz | G06F 11/2294 714/4.2 |

(Continued)

FOREIGN PATENT DOCUMENTS

| EP | 1560375 A1 | 8/2005 |
|---|---|---|
| WO | 2018064107 A1 | 4/2018 |

OTHER PUBLICATIONS

International Search Report; International Application No. GB 2116492.6; International Filing Date: Nov. 16, 2021; dated Feb. 28, 2022; 6 pages.

*Primary Examiner* — Mohamed A. Wasel
*Assistant Examiner* — Kidest Mendaye
(74) *Attorney, Agent, or Firm* — Cantor Colburn LLP; Edward Wixted

(57) ABSTRACT

Embodiments of the invention are directed to registering one or more endpoint devices to receive a notification and detecting a congestion event related to a storage area network. The storage area network includes the one or more endpoint devices. The notification is sent regarding the congestion event to the one or more endpoint devices that have been registered for the notification.

17 Claims, 9 Drawing Sheets

(56) References Cited

U.S. PATENT DOCUMENTS

| | | | |
|---|---|---|---|
| 2006/0171330 A1* | 8/2006 | Mandrell | H04L 49/357 370/254 |
| 2008/0250169 A1* | 10/2008 | Coca | G06F 11/0709 710/52 |
| 2011/0205898 A1* | 8/2011 | Ichiki | H04L 47/122 370/252 |
| 2012/0075999 A1* | 3/2012 | Ko | H04L 45/121 370/252 |
| 2012/0177041 A1* | 7/2012 | Berman | H04L 69/22 370/392 |
| 2013/0297966 A1 | 6/2013 | Hao et al. | |
| 2014/0280893 A1* | 9/2014 | Pfeifer | H04L 43/06 709/224 |
| 2014/0351545 A1* | 11/2014 | Nakajima | G06F 3/0617 711/170 |
| 2016/0342548 A1* | 11/2016 | Hathorn | H04L 67/10 |
| 2017/0142020 A1* | 5/2017 | Sundararaman | H04L 43/16 |
| 2020/0112486 A1 | 4/2020 | Lissack | |
| 2020/0280518 A1 | 9/2020 | Lee et al. | |

\* cited by examiner

FIG. 7

| ENDPOINT DEVICE | NETWORK ID | PORT ID | OTHER IDENTIFICATIONS |
|---|---|---|---|
| ABC | DEF | GHI | BLADE SERVER J; ZONE K, SWITCH L |
| ... | | | |

ENDPOINT NOTIFICATION OF STORAGE AREA NETWORK CONGESTION

BACKGROUND

The present invention generally relates to computer systems, and more specifically, to computer-implemented methods, computer systems, and computer program products configured and arranged to provide endpoint notification of storage area network congestion.

A storage area network (SAN) or storage network is a computer network which provides access to consolidated, block-level data storage. At its simplest, a SAN is a dedicated network for data storage. A SAN is a combination of hardware and software. SANs are primarily used to access storage devices, such as disk arrays and tape libraries from servers so that the devices appear to the operating system as direct-attached storage. A SAN typically is a dedicated network of storage devices not accessible through the local area network (LAN). Although a SAN provides only block-level access, file systems built on top of SANs do provide file-level access and are known as shared-disk file systems. SANs are sometimes referred to as the network behind the servers and historically developed out of a centralized data storage model, but with its own data network. In addition to storing data, SANs allow for the automatic backup of data and the monitoring of the storage as well as the backup process.

SUMMARY

Embodiments of the present invention are directed to endpoint notification of storage area network congestion. A non-limiting example computer-implemented method includes registering one or more endpoint devices to receive a congestion notification and detecting a congestion event related to a storage area network. The storage area network includes the one or more endpoint devices. The computer-implemented method includes sending a notification regarding the congestion event to the one or more endpoint devices that have been registered for the notification.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 depicts an example entry of a table in an endpoint devices registration database in accordance with one or more embodiments of the present invention;

DETAILED DESCRIPTION

One or more embodiments of the present invention provide computer-implemented methods, computer systems, and computer program products for endpoint notification of storage area network (SAN) congestion. SAN vendors have implemented many different mechanisms and tools to detect network congestion, such as bottleneck detection, SAN analytics, etc. In the state-of-the-art, network congestion is only detected by a server when a port starts experiencing increased duration, such as, for example, when transmit (TX) buffer credits are at zero. Today, there is no way for a network device in the SAN to communicate with a server, control unit (CU), or any attached endpoint device, that the network device has detected network congestion.

According to one or more embodiments of the invention, a network device in the SAN is structured to send a notification about the detected network congestion to a server, control unit (CU), and/or any attached endpoint device. This allows the attached endpoint device to receive notification of the detected network congestion, which can automatically trigger appropriate changes by the endpoint device. In accordance with one or more embodiments of the invention, endpoint devices are configured to register with the network (i.e., network devices) to receive notifications for specific network identifiers and/or port identifiers. A network device detects a congestion event. Network devices can collect data from associated segments of the network impacted by the network event. Network devices transmit data to attached endpoint devices that are registered to receive associated data regarding network event characteristics. Network congestion in data networking and queueing refers to the reduced quality of service that occurs when a network node and/or link is carrying more data than it can handle. Typical effects include queueing delay, packet loss, and/or the blocking of new connections.

Figure 1:
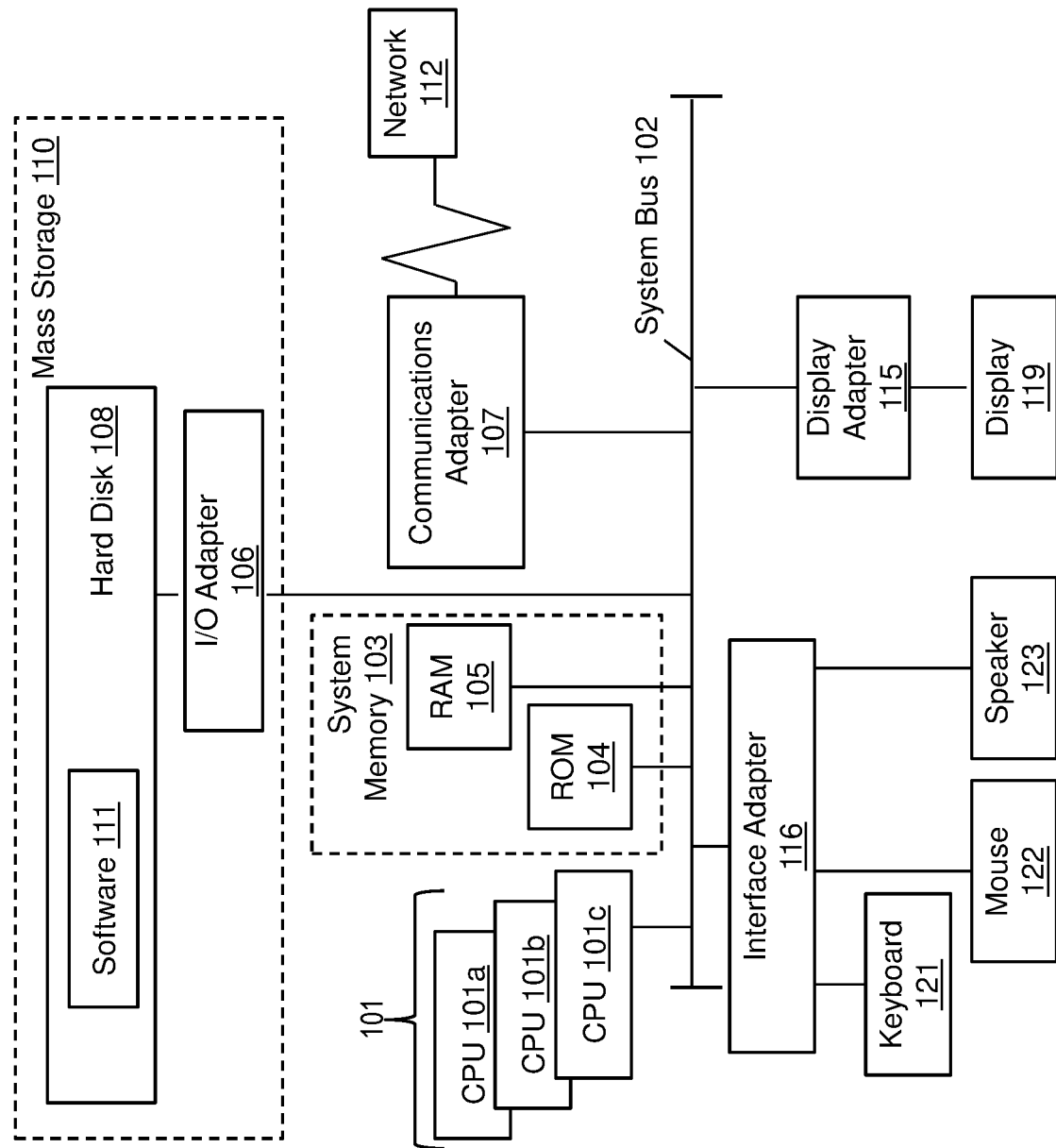
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, or smartphone. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types. Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 can be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
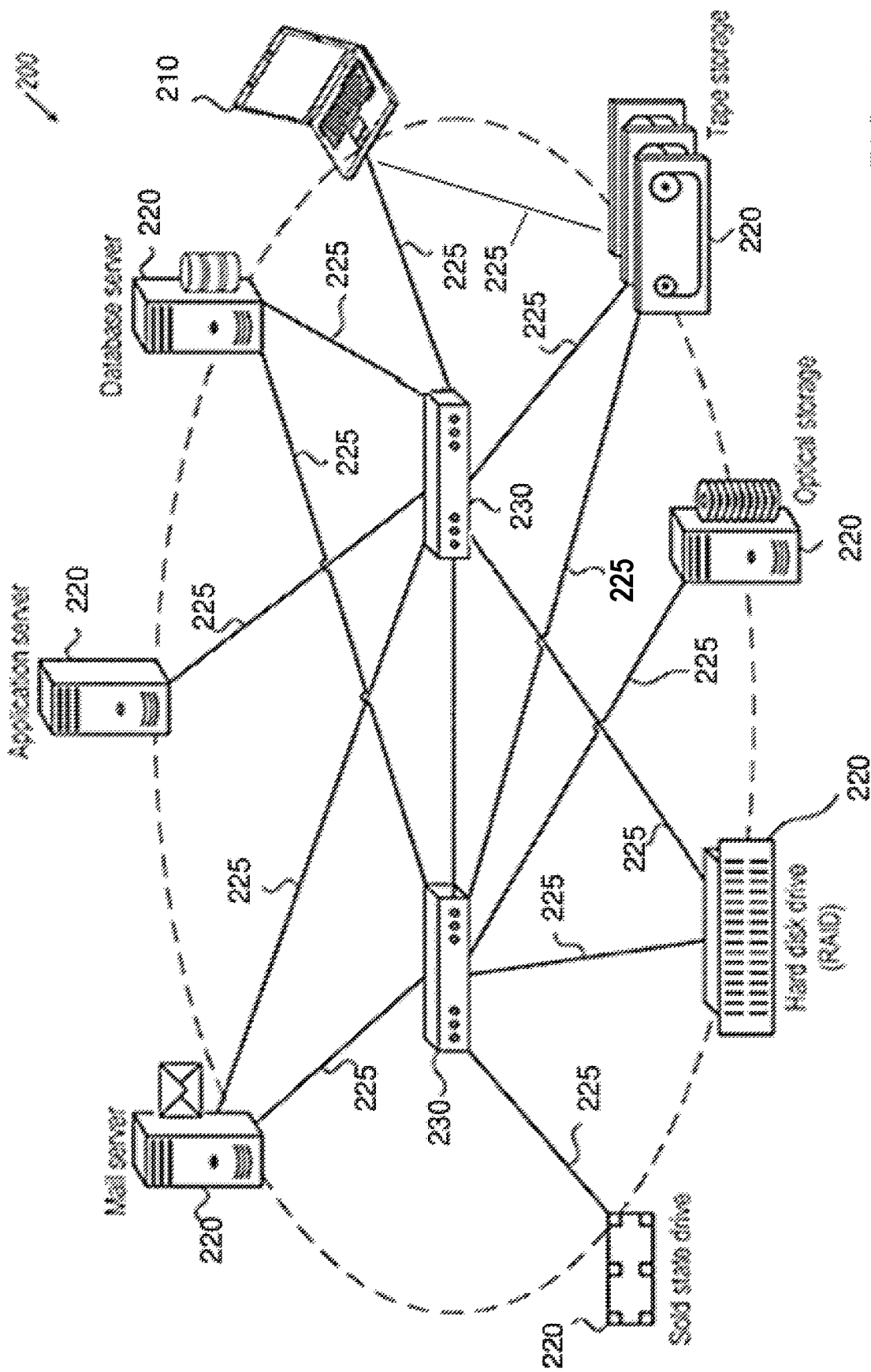
FIG. 2 depicts a block diagram of a system for endpoint notification of storage area network congestion in accordance with one or more embodiments of the present invention.

FIG. 2 is a schematic diagram of a storage area network (SAN) 200 with endpoint notification of storage area network congestion in accordance with one or more embodiments of the present invention. SAN 200 includes a plurality of endpoint devices 210 and endpoint devices 220 that are each connected to one or more network devices 230, such as switches. Network devices 230 include memory circuitry and processing circuitry (e.g. including monitoring circuitry and limiting circuitry). The network topology of SAN 200 may be a switched fabric, where network devices 230 are switches. In one or more embodiments, a particular network device 230 that is a switch may be set to switch mode or N-port ID virtualization (NPIV) mode. In one or more embodiments, at least one of the endpoint devices 210, 220 in the SAN 200 is configured as a host device. For example, endpoint device 210 can be the host device. In one or more embodiments, the host device as endpoint device 210 is embodied in a computer system, such as computer system 100 shown in FIG. 1. Further, any of the endpoint devices 210, 220 and network devices 230 can be implemented using any of the functions and hardware and software components described in computer system 100.

In one or more embodiments, each of the network devices 230 includes a plurality of ports that connect the network devices 230 to various endpoint devices 210, 220 via links 225. In addition, each endpoint device 210, 220 includes one or more ports that connect the end devices to one or more network devices 230 and/or to other endpoint devices 220. In one or more embodiments, each link 225 is defined by the two ports that are connected to the link 225. The ports of endpoint devices 220, 210 are referred to as channel ports while the ports of the network devices 230 are referred to as switch ports.

In one or more embodiments, the network devices 230 support the Fibre Channel (FC) and/or Fibre channel over Ethernet (FCoE) Protocols. For example, a particular fixed port network device may support the FC protocol and/or the FCoE protocol. As another example, if a particular network device 230 includes a plurality of line cards, at least some of which may support the FC protocol and/or at least some of which may support the FCoE protocol. It is noted that a particular port on a particular network device 230 may support the FC protocol or the FCoE protocol by default or as configured (e.g., if the particular port is a universal port). Optionally, network devices 230 support one or more other protocols such as simple network management protocol (SNMP) for collecting information, e.g., for output on the management device implemented as endpoint device 210.

Figure 3:
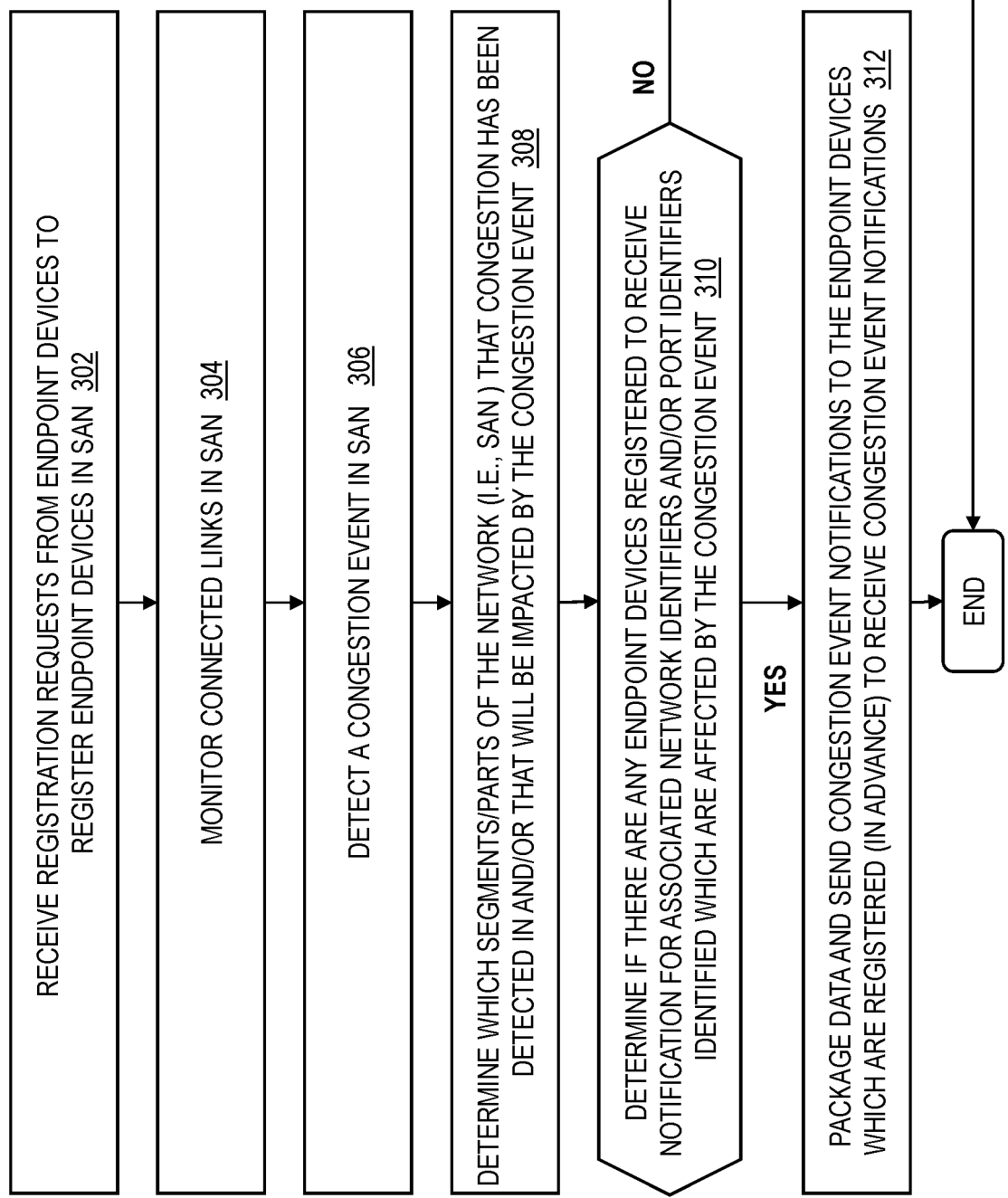
FIG. 3 depicts a flowchart of a computer-implemented process for endpoint notification of storage area network congestion in accordance with one or more embodiments of the present invention.
Figure 4:
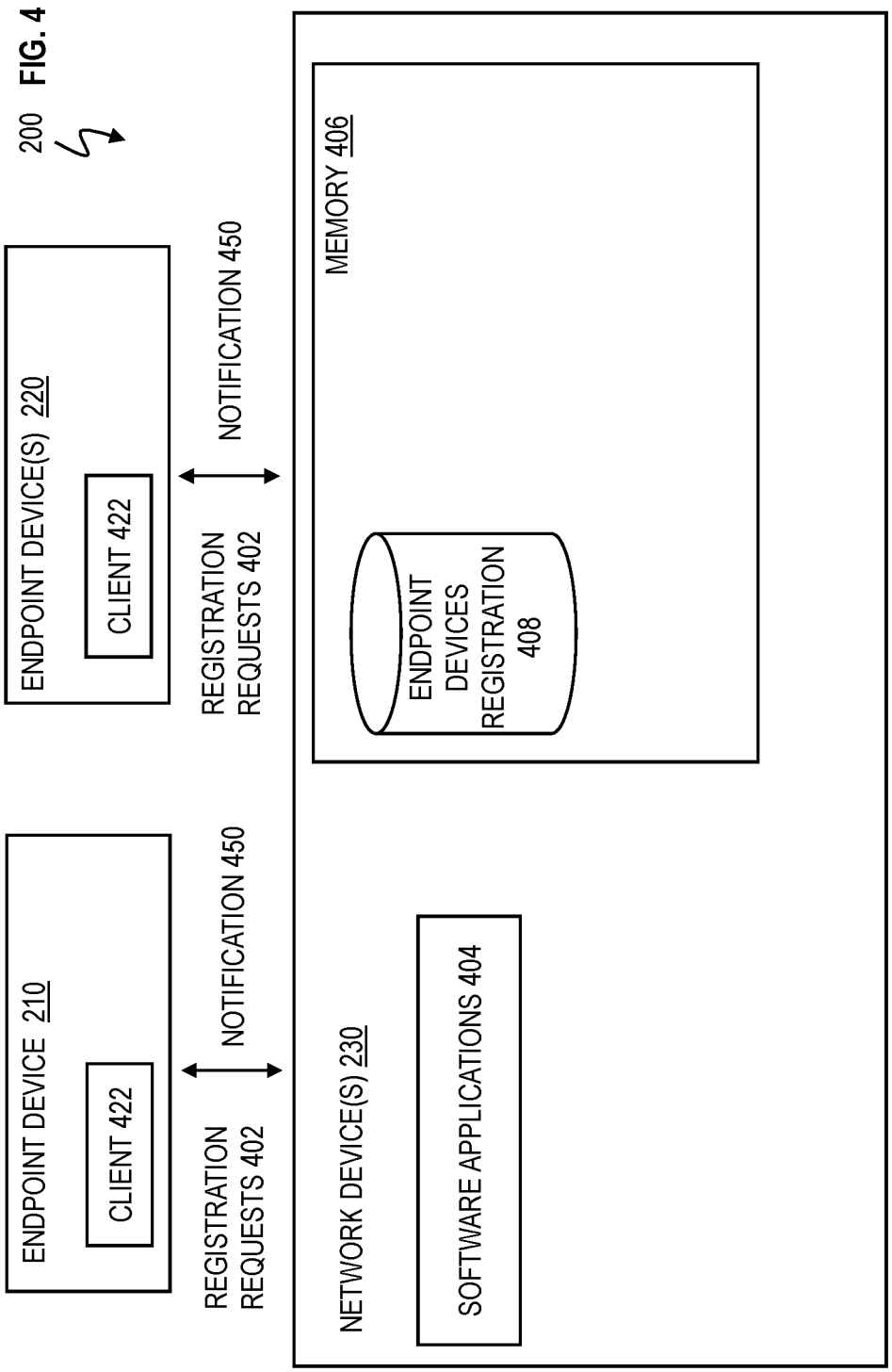
FIG. 4 depicts a block diagram of an abbreviated storage area network illustrating further details of an example network device and example endpoint devices in accordance with one or more embodiments of the present invention.

FIG. 3 is a flowchart of a computer-implemented process 300 for endpoint notification of storage area network congestion in accordance with one or more embodiments of the present invention. FIG. 4 is a block diagram of an abbreviated SAN 200 illustrating further details of example network device 230, example endpoint device 210, and endpoint device 220 in accordance with one or more embodiments of the invention. Although the abbreviated view of SAN 200 in FIG. 4 only shows a single endpoint device 210 and single endpoint device 220 each connected to a single network device 230, this simplified view in FIG. 4 is only for explanation purposes and is not meant to be limited. Rather, SAN 200 in FIG. 4 can have numerous endpoint devices 210, 230 variously connected to numerous network devices 230 analogous to SAN 200 illustrated in FIG. 2. The computer-implemented process 300 in FIG. 3 can be implemented using SAN 200 shown in FIGS. 2 and 4, along with computer system 100 and/or elements of computer system 100 shown in FIG. 1. Accordingly, the computer-implemented process 300 will now be described with reference to FIGS. 1, 2, and 4.

At block 302, software applications 404 of network devices 230 are configured to receive registration requests 402 from endpoint devices 210, 220 to register endpoint devices 210, 220 in SAN 200. Networks devices 230 receive registration requests 402 from endpoint devices 210, 220 that are respectively connected to the network devices 230. The registration requests 402 indicate that endpoint devices 210, 220 are registering to receive notifications for specific network identifiers and/or port identifiers, as well as specific server blades, zones, and switches (network devices 230) in SAN 200. In one or more embodiments, endpoint devices 210, 220 each can have a client application 422 configured to register with software applications 404 of desired network devices 230, and/or another method can be used for registration.

Software applications 404 can be implemented as software 111 executed on one or more processors 101, as discussed in FIG. 1. Similarly, client application 422 can be implemented using software 111 configured to execute on one or more processors 101. Client application 422 can include cookies, plug-ins, thin clients, etc., and client application 422 can serve as a piece of computer software that accesses network devices 230. Registration requests 402 can include credentials and/or credentials may have been previously submitted for each endpoint device 210, 220. In accordance with the identified network identifiers and/or port identifiers requested in registration requests 402 for respective endpoint devices 210, 220, software applications 404 of network devices 230 are each configured to register the network identifiers and/or port identifiers requested by endpoint devices 210, 220 along with specific server blades, zones, and switches (network devices 230) requested. Software applications 404 in each network device 230 are configured to store their respective listing of registered endpoint devices 210, 220 and their registered network identifiers and/or port identifiers in endpoint devices registration database 408 in memory 406. Endpoint devices registration database 408 can include a table with an entry for each registered endpoint devices 210, 220. An example entry of the table in endpoint devices registration database 408 for an example endpoint device is illustrated in FIG. 7. In FIG. 7, an example endpoint device 210, 220 is depicted as "ABC". The table shows that the endpoint device "ABC" (e.g., endpoint device 210, 220) registered for notifications for network ID "DEF", port ID "GHI", and for other identification such as blade server "J", zone "K", and switch "L" (e.g., a particular network device 230). Although FIG. 7 is illustrative of a single entry in a table for a single endpoint device that has been registered with a network device 230, the table in endpoint devices registration database 408 includes numerous entries of various endpoint devices that have been registered. Also, example endpoint device "ABC" can register to receive congestion notifications from numerous network devices 230 to which it is connected, such as from a first network device 230, a second network device 230, a third network device 230, etc.

Within SAN 200, each port has a unique port identifier (or port address) that serves as the Fibre channel (FC) address for the port. This port identifier (or port address) enables routing of data through SAN 200 to that port on the network devices 230. Network devices 230 (e.g., FC switches) assign the port identifiers when the endpoint device logs into the fabric (i.e., SAN 200). Port identifiers include physical identifiers and logical identifiers. Port addresses are port level addresses which are physical addresses on network devices 230 and endpoint devices 210, 220. Logical identifiers also referred to as link addresses are logical identifiers associated with network devices 230 and endpoint devices 210, 220. Network identifiers include domain identifiers (DID) and fabric identifiers (FID). A domain identifier is a physical identification of a physical switch such as network device 230. A fabric identifier is a logical identifier for one or more switches such as one or more network devices 230 and/or one of more optical fibers (i.e., cables) (or maybe copper wires).

Referring to FIG. 3, at block 304, each of the network devices 230 are configured to monitor their connected links 225 in SAN 200. Although a link 225 is illustrated as a single line for simplicity, link 225 include numerous cables such as fiber optic cables, ethernet cables, coaxial cables, etc. Software applications 404 can include, be integrated with, and/or communicate with one or more monitoring software applications and/or tools. Any suitable monitoring applications and/or tools can be used for monitoring the network as discussed herein. Example monitoring software applications/tools include bottleneck detection, SAN analytics, etc.

At block 306, software applications 404 of network device 230 are configured to detect a congestion event in SAN 200. A congestion event is an observed slowdown that could be caused by many things. There could be an endpoint that is slow in its receiving of frames (commonly referred to as a slow drain device), and/or the congestion event could be due to component or link failure (e.g., one of two redundant components failed so the remaining one now has twice the work). Congestion can also be due to "over subscription" of an Inter Switch Link (ISL) or network device internal switching infrastructure. Over subscription occurs when the total bandwidth of the ports attached to devices is greater than the total internal switching infrastructure. In one or more embodiments, this detection of a congestion event uses known technology that is based on vendor specific implementation. The congestion event is congestion in data networking and queueing causing a reduced quality of service which occurs when a network node (e.g., network device 230) and/or link (e.g., one or more cables represented in link 225) is carrying more data than it can handle. A congestion event can occur when a threshold is met regarding queueing delay, packet loss, and/or the blocking of new connections.

At block 308, software applications 404 of network device 230 are configured to determine which segments/parts of the network (i.e., SAN 200) that congestion has been detected in and/or that will be impacted by the congestion event. There are various ways for data collection to detect segments/parts of SAN 200 that are impacted, and congestion could be based on and/or identified by a network identifier such as by Domain ID (DID) and/or, Fabric ID (FID), by physical link address(es) such as Port IDs, by logical link address(es) such as Channel IDs, etc. The congested segments can also be identified by specific server blades, zones, switches (e.g., network devices 230), etc. In one or more embodiments, determination of the congested segment can use any known technology.

At block 310, software applications 404 of network device 230 are configured to determine if there are any endpoint devices 210, 220 registered to receive notification for associated network identifiers and/or port identifiers identified which are affected by the congestion event, including specific server blades, zones, switches (e.g., network devices 230). For example, software applications 404 of network device 230 are configured to check/compare the identified network identifiers and/or port identifiers (as well as specific server blades, zones, switches (e.g., network devices 230)) in the congestion event to the registered network identifiers and/or port identifiers (along with specific registered server blades, zones, switches (e.g., network devices 230)) having been registered by respective endpoint devices 210, 220. If no matches, the flow ends. If yes there are endpoint devices 210, 220 registered to receive notification for the associated network identifiers and/or port identifiers (specific server blades, zones, switches (e.g., network devices 230), at block 312, software applications 404 of network device 230 are configured to package data and send congestion event notifications 450 to the endpoint devices 210, 220 which are registered (in advance) to receive congestion event notifications 450.

In one or more embodiments, congestion event notifications 450 and unsolicited messages may be sent via the FICON (Fibre CONnection) Director's Control Device, more commonly known as the control unit port (CUP). Network devices 230 include a control unit port that each of the endpoint devices 210, 220 can communicate with. Endpoint devices 210, 220 can be configured to use the control unit port (e.g., in band communication). A control unit provides the logical capabilities necessary to operate and control an I/O device and adapts the characteristics of each device so that it can respond to the standard form of control provided by the channel subsystem. Communication between the control unit and the channel subsystem takes place over a channel path. The control unit accepts control signals from the channel subsytem, controls the timing of data transfer over the channel path, and provides indications concerning the status of the device. A control unit port is a logical control unit that is contained in the network device 230. The control unit port (CUP) function allows a z/OS® system to communicate with the FICON® Director through channel programs. This includes control functions like blocking and unblocking ports, performance monitoring, and error reporting functions. The CUP device is simulated as a special firmware load on the switch that allows a z/OS® system to issue channel programs to it. The CUP device is defined in the I/O configuration as a switch device and is brought online to z/OS®. The control unit definition for the CUP device consists of one or more channel paths attached to the switch with the reserved port address destination of 0xFE, which is defined by the FICON architecture as the address of the control unit port (CUP). Therefore, I/O requests routed to this destination port are directed to the CUP.

Similar unsolicited messages can include Read Diagnostic Parameters (RDP) information. Unsolicited messages may be for communicating things such as status or alerts that are not generated by a request. In general operation, IBM® z/OS® server sends a command to the CUP for data, and the CUP responds to the commands. These are solicited messages. Unsolicited messages are when the CUP sends messages/data to the IBM® z/OS® server without a command. In one or more embodiments, congestion event notifications 450 may be send out of band via a simple network management port (SNMP) to the endpoint devices 210, 220. In one or more embodiments, congestion event notifications 450 may be sent via Common Information Model Object Manager (CIMOM) to the endpoint devices 210, 220. In one or more embodiments, congestion event notifications 450 can be sent as an Extended Link Service (ELS) to the endpoint devices 210, 220.

Figure 5:
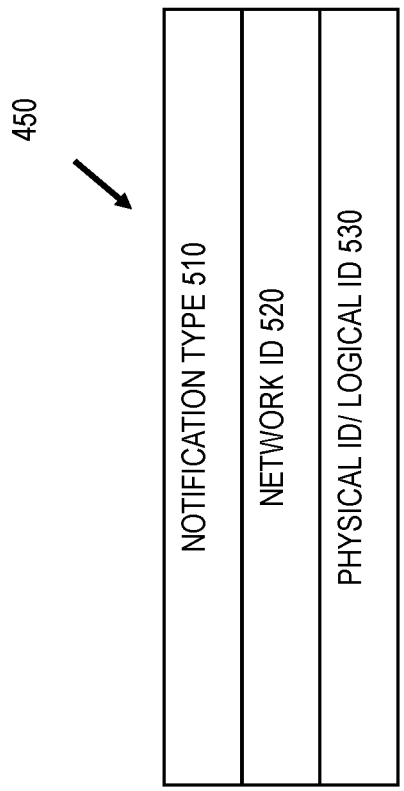
FIG. 5 depicts a block diagram of an example message structure for a congestion event notification in accordance with one or more embodiments of the present invention.

FIG. 5 is a block diagram of an example message structure for an example congestion event notification 450 in accordance with one or more embodiments of the invention. In FIG. 5, congestion event notification 450 includes notification type 510, network identifier 520, and physical/logical identifier 530. The notification type 510 can be one of two types, which are congestion detection and network healthy. When network device 230 does not detect a congestion (i.e., congestion event) for a predetermined period of time and/or after a resolved congestion event, software applications 404 of network device 230 are configured send congestion event notification 450 to its registered endpoint devices 210, 220 indicating that the network is healthy.

In congestion event notification 450, the network identifier 520 identifies where the congestion occurs. The network identifier 520 can include domain identifiers (DID) as a physical identification of the physical switch such as one or more network devices 230 that are causing and/or experiencing congestion. Since DID is the identifier for a physical switch within a SAN, DID this is specific to a single network device 230. Also, the network identifier 520 can include fabric identifiers (FID) as a logical identifier for one or more switches such as one or more network devices 230 that are causing and/or experiencing congestion. The FID is a logical assignment to each fabric that exists in a SAN, which may span across multiple network devices 230. In one or more embodiments, the network identifier 520 can also list a zone, blade server, and/or switch that is experiencing congestion. SAN zoning is a method of arranging fibre channel devices (such as one or more network devices 230 and one or more endpoint devices 210, 220) into logical groups over the physical configuration of the fabric. SAN zoning may be utilized to implement compartmentalization of data for security purposes.

In congestion event notification 450, physical/logical identifiers 530 include unique port identifiers (i.e., port addresses) of network devices 230 experiencing congestion, where the port identifiers include physical identifiers and logical identifiers. Port addresses are port level addresses which are physical addresses on network devices 230 while logical identifiers are logical identifiers associated with network devices 230.

In response to receiving congestion event notification 450 from network device 230, the congestion event notification 450 could act as a trigger that causes client application 422 on endpoint device 210, 220 to reduce data on the associated link 225 identified with respect to the network ID 520 and/or physical ID/logical ID 530. Also, in response to receiving congestion event notification 450 from network device 230, the congestion event notification 450 could act as a trigger that causes client application 422 to search for and connect to another network device 230 that did not send out a congestion event notification 450, to send more data (traffic) to a previously connected to network device 230 that did not send out a congestion event notification 450 while reducing data on the network device 230 that sent a congestion event notification 450, etc. In response to receiving congestion event notification 450 from network device 230, the congestion event notification 450 could act as a trigger that causes client application 422 on endpoint device 210, 220 to pause/stop all data associated with the impacted network ID 520 and/or physical ID/logical ID 530 until a healthy network congestion event notification 450 is sent by network device 230.

Figure 6:
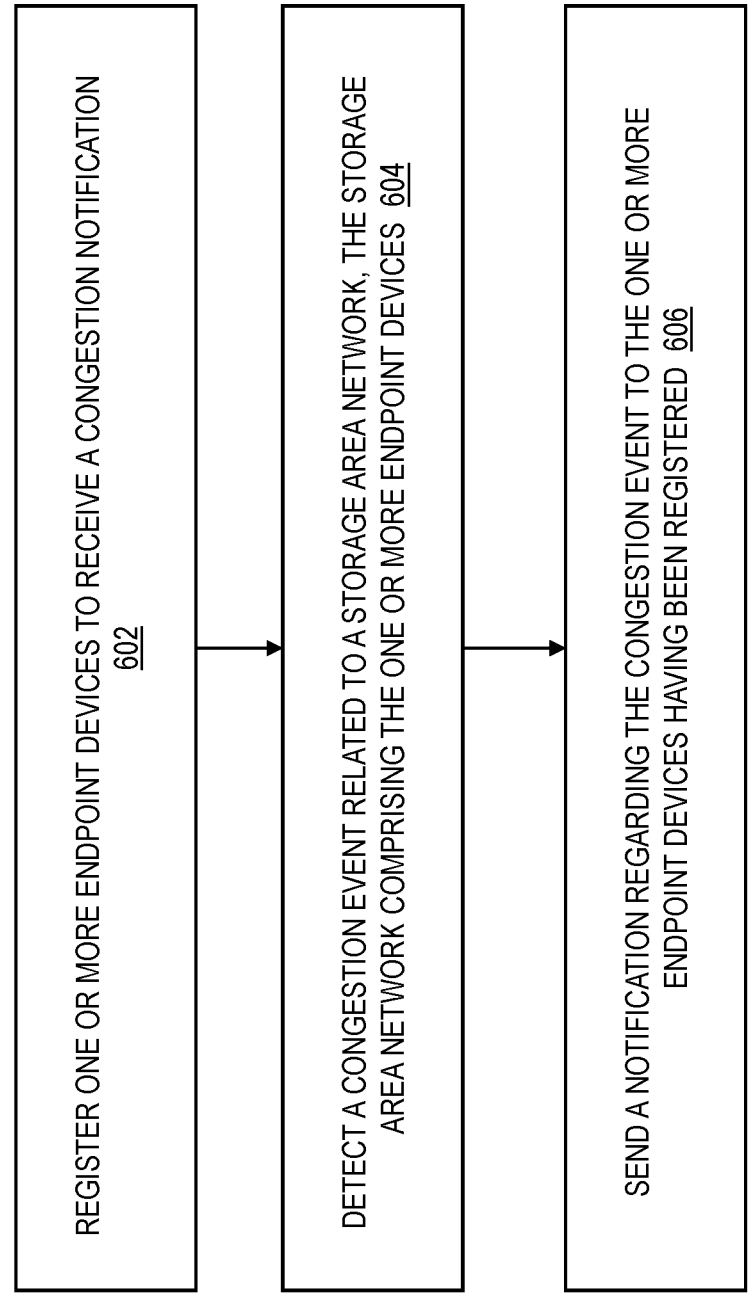
FIG. 6 depicts a flowchart of a computer-implemented method for providing endpoint notification of storage area network congestion in accordance with one or more embodiments of the present invention.

FIG. 6 depicts a flowchart of a computer-implemented method 600 for provide endpoint notification of storage area network (SAN) congestion in accordance with one or more embodiments of the invention. The computer-implemented method 600 in FIG. 6 can be implemented SAN 200 using one or more networks devices 230 shown in FIG. 2, along with computer system 100 and/or elements of computer system 100 in FIG. 1. At block 602, software applications 404 of network device 230 are configured to register one or more endpoint devices (e.g., one or more endpoint devices 210 and/or one or more endpoint devices 220) to receive a congestion event notification 450. At block 604, software applications 404 of network device 230 are configured to detect a congestion event related to a storage area network 200, the storage area network 200 comprising the one or more endpoint devices 210, 220. At block 606, software applications 404 of network devices 230 are configured to send a notification 450 regarding the congestion event to the one or more endpoint devices 210, 220 that have registered to receive the notification 450.

A network device 230 is configured to store a listing in a database (e.g., endpoint devices registration database 408) of the one or more endpoint devices 210, 220 that have registered for the notification 450. A network device 230 is configured to receive a request (e.g., registration request 402) for notification from the one or more endpoint devices 210, 220, the request comprising one or more network identifiers of devices (e.g., network devices 230, endpoint devices 210, endpoint devices 220) in the storage area network 200. Network device 220 is configured to respond to receiving the request, store in a database (e.g., endpoint devices registration database 408) the one or more network identifiers.

A network device 230 is configured to receive a request (e.g., registration request 402) for notification from the one or more endpoint devices 210, 220, the request comprising one or more port identifiers of devices (e.g., network devices 230, endpoint devices 210, endpoint devices 220) in the storage area network 200; the network device 230 is configured to respond to receiving the request, store in a database (e.g., endpoint devices registration database 408) the one or more port identifiers. The one or more endpoint devices 210, 220 have registered with a network device 230 to utilize the control unit port (CUP). The network device 230 is configured to permit the one or more endpoint devices 210, 220 to utilize the control unit port and operate as a control unit for communicating directly with the network device 230. The notification 450 is configured to be sent using a common information model object manager (CIMOM).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
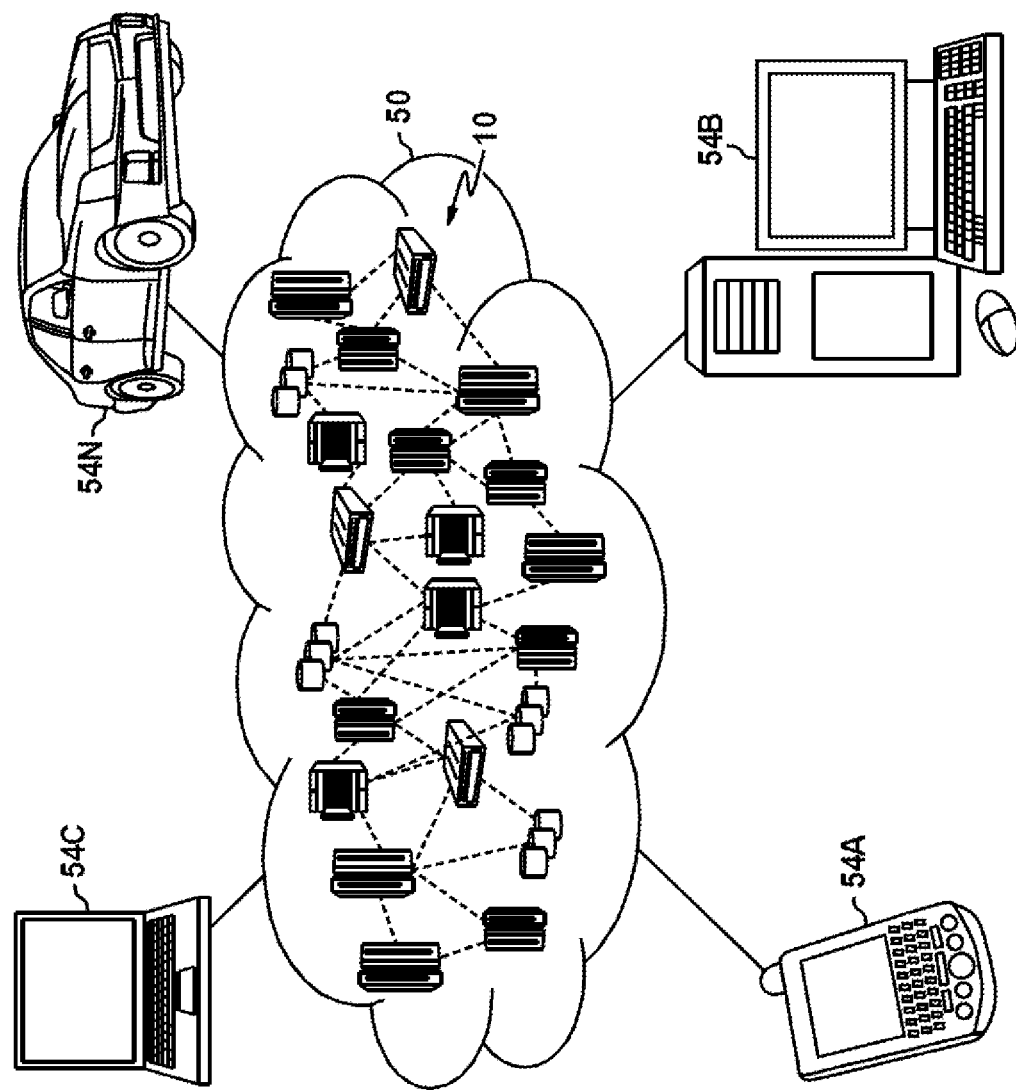
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
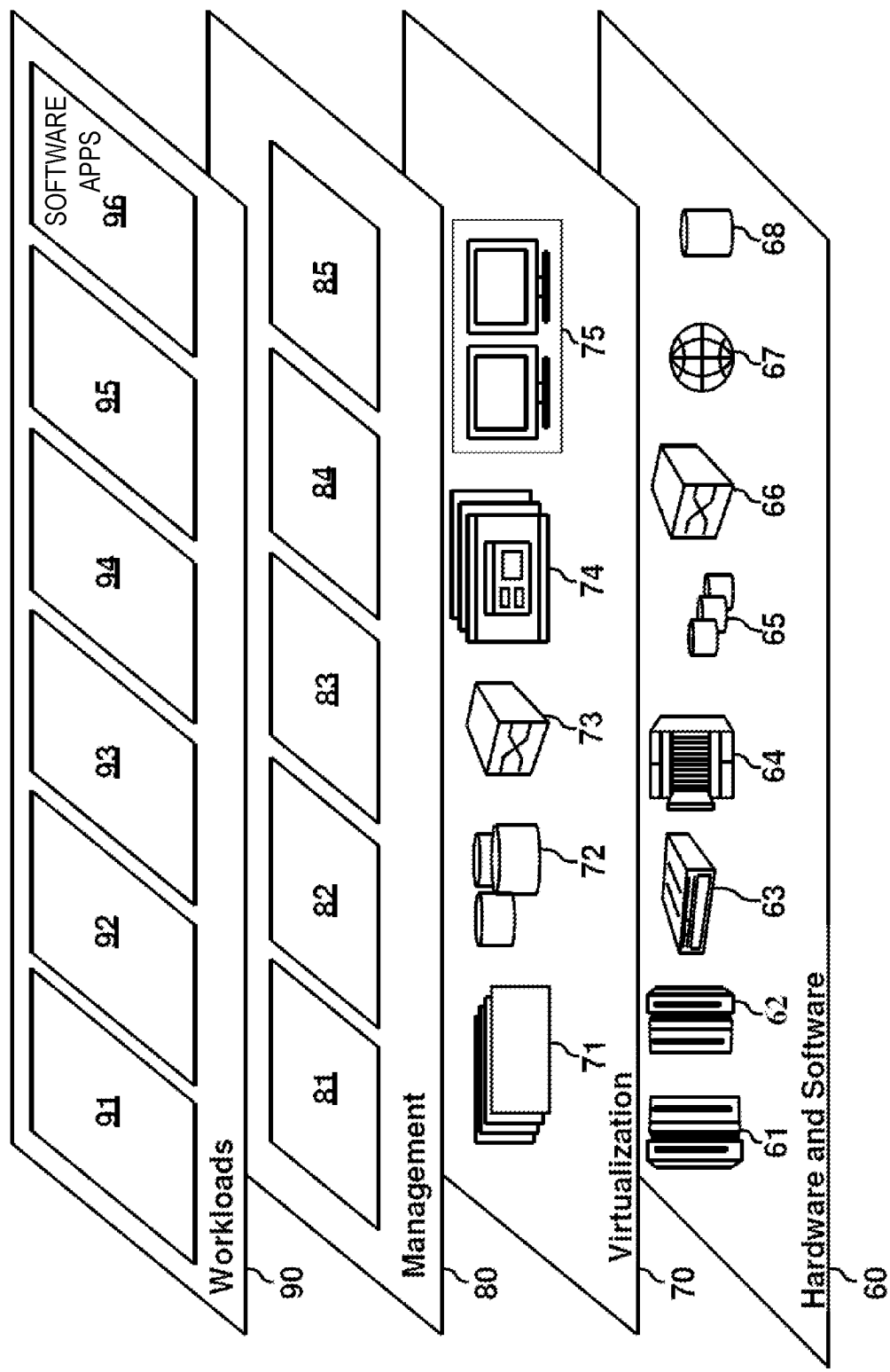
FIG. 9 depicts abstraction model layers according to one or more embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 404, client applications 422, etc.) implemented in workloads and functions 96. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   registering one or more endpoint devices to receive a notification;
   storing, by a network device in the storage area network, entries in a database of the one or more endpoint devices that have registered for the notification, the entries comprising an indication that at least one of the one or more endpoint devices has registered to receive the notification about identified hardware components in the storage area network, one entry of the entries for the at least one of the one or more endpoint devices having a block comprising at least one server blade, at least one switch, and at least one zone as identified hardware components to watch for congestions events;
   detecting a congestion event related to a storage area network, the storage area network comprising the one or more endpoint devices;
   comparing data in the congestion event to the block comprising the at least one server blade, the at least one switch, and the at least one zone as the identified hardware components to watch for congestions events in order to find a match; and
   in response to finding the match, sending the notification regarding the congestion event related to the storage area network to the one or more endpoint devices that have been registered for the notification, the notification being a trigger to cause the one or more endpoint devices to reroute traffic.

2. The computer-implemented method of claim 1, further comprising:
receiving, by the network device, a request for notification from the one or more endpoint devices, the request comprising one or more network identifiers of devices in the storage area network; and
responsive to receiving the request, storing by the network device, in a database the one or more network identifiers.

3. The computer-implemented method of claim 1, further comprising:
receiving, by the network device, a request for notification from the one or more endpoint devices, the request comprising one or more port identifiers of devices in the storage area network; and
responsive to receiving the request, storing, by the network device, in a database the one or more port identifiers.

4. The computer-implemented method of claim 1, wherein the network device is configured to register the one or more endpoint devices to utilize a control unit port.

5. The computer-implemented method of claim 4, wherein the network device is configured to permit the one or more endpoint devices to utilize the control unit port.

6. The computer-implemented method of claim 1, wherein the notification is configured to be sent using a common information model object manager (CIMOM).

7. A system comprising:
a memory having computer readable instructions; and
one or more processors for executing the computer readable instructions, the computer readable instructions controlling the one or more processors to perform operations comprising:
registering one or more endpoint devices to receive a notification;
storing, using a network device in the storage area network, entries in a database of the one or more endpoint devices that have registered for the notification, the entries comprising an indication that at least one of the one or more endpoint devices has registered to receive the notification about identified hardware components in the storage area network, one entry of the entries for the at least one of the one or more endpoint devices having a block comprising at least one server blade, at least one switch, and at least one zone as identified hardware components to watch for congestions events;
detecting a congestion event related to a storage area network, the storage area network comprising the one or more endpoint devices;
comparing data in the congestion event to the block comprising the at least one server blade, the at least one switch, and the at least one zone as the identified hardware components to watch for congestions events in order to find a match; and
in response to finding the match, sending the notification regarding the congestion event related to the storage area network to the one or more endpoint devices that have been registered for the notification, the notification being a trigger to cause the one or more endpoint devices to reroute traffic.

8. The system of claim 7, further comprising:
receiving, by the network device, a request for notification from the one or more endpoint devices, the request comprising one or more network identifiers of devices in the storage area network; and
responsive to receiving the request, storing by the network device, in a database the one or more network identifiers.

9. The system of claim 7, further comprising:
receiving, by the network device, a request for notification from the one or more endpoint devices, the request comprising one or more port identifiers of devices in the storage area network; and
responsive to receiving the request, storing, by the network device, in a database the one or more port identifiers.

10. The system of claim 7, wherein the network device is configured to register the one or more endpoint devices to utilize a control unit port.

11. The system of claim 10, wherein the network device is configured to permit the one or more endpoint devices to utilize the control unit port.

12. The system of claim 7, wherein the notification is configured to be sent using a common information model object manager (CIMOM).

13. A computer program product comprising a computer readable storage medium having program instructions embodied therewith, the program instructions executable by a processor to cause the processor to perform operations comprising:
registering one or more endpoint devices to receive a notification;
storing, using a network device in the storage area network, entries in a database of the one or more endpoint devices that have registered for the notification, the entries comprising an indication that at least one of the one or more endpoint devices has registered to receive the notification about identified hardware components in the storage area network, one entry of the entries for the at least one of the one or more endpoint devices having a block comprising at least one server blade, at least one switch, and at least one zone as identified hardware components to watch for congestions events;
detecting a congestion event related to a storage area network, the storage area network comprising the one or more endpoint devices;
comparing data in the congestion event to the block comprising the at least one server blade, the at least one switch, and the at least one zone as the identified hardware components to watch for congestions events in order to find a match; and
in response to finding the match, sending the notification regarding the congestion event related to the storage area network to the one or more endpoint devices that have been registered for the notification, the notification being a trigger to cause the one or more endpoint devices to reroute traffic.

14. The computer program product of claim 13, further comprising:
receiving, by the network device, a request for notification from the one or more endpoint devices, the request comprising one or more network identifiers of devices in the storage area network; and
responsive to receiving the request, storing by the network device, in a database the one or more network identifiers.

15. The computer program product of claim 13, further comprising:
receiving, by the network device, a request for notification from the one or more endpoint devices, the request comprising one or more port identifiers of devices in the storage area network; and responsive to receiving the request, storing, by the network device, in a database the one or more port identifiers.

16. The computer program product of claim 13, wherein the network device is configured to register the one or more endpoint devices to utilize a control unit port.

17. The computer program product of claim 16, wherein the network device is configured to permit the one or more endpoint devices to utilize the control unit port.

* * * * *